(12) United States Patent
Hochhaus et al.

(10) Patent No.: US 7,032,740 B2
(45) Date of Patent: Apr. 25, 2006

(54) DEVICE FOR SENSING THE WEAR STATE OF WHEELS OR ROLLERS

(75) Inventors: Frank Hochhaus, Frankfurt (DE); Jaro Kubik, Babenhausen (DE); Frank König, Paris (FR)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/824,872

(22) Filed: Apr. 15, 2004

(65) Prior Publication Data

US 2004/0206606 A1 Oct. 21, 2004

(30) Foreign Application Priority Data

Apr. 17, 2003 (DE) .................. 103 17 946

(51) Int. Cl.
*B65G 43/00* (2006.01)

(52) U.S. Cl. ............... 198/502.1; 198/810.01; 198/810.02; 198/810.03; 198/810.04; 356/630; 356/634; 356/635

(58) Field of Classification Search ........... 198/502.1, 198/810.01–810.04; 356/630, 634, 635
See application file for complete search history.

(56) References Cited

U.S. PATENT DOCUMENTS

| | | | | |
|---|---|---|---|---|
| 4,031,368 A | * | 6/1977 | Colding et al. ............ 700/173 |
| 4,381,152 A | * | 4/1983 | Riech et al. ............... 356/635 |
| 4,798,963 A | * | 1/1989 | Wittkopp et al. ........ 250/559.22 |
| 4,866,642 A | * | 9/1989 | Obrig et al. .............. 702/157 |
| 4,932,784 A | * | 6/1990 | Danneskiold-Samsoe ... 356/602 |
| 5,114,230 A | * | 5/1992 | Pryor ...................... 356/625 |
| 5,117,081 A | * | 5/1992 | Bagdal .................... 219/69.11 |
| 5,345,954 A | * | 9/1994 | Dall'osso et al. ........ 131/280 |
| 5,936,737 A | * | 8/1999 | Naumann ................. 356/613 |
| 6,161,055 A | * | 12/2000 | Pryor ....................... 700/175 |
| 6,281,679 B1 | * | 8/2001 | King et al. ............... 324/229 |
| 6,349,813 B1 | * | 2/2002 | Offerman et al. ......... 198/328 |
| 6,549,293 B1 | * | 4/2003 | Hofman .................... 356/635 |
| 6,768,551 B1 | * | 7/2004 | Mian et al. ............... 356/446 |

* cited by examiner

Primary Examiner—Gene O. Crawford
Assistant Examiner—Leslie A. Nicholson, III
(74) Attorney, Agent, or Firm—Van Dyke, Gardner, Linn & Burkhart, LLP

(57) ABSTRACT

The invention relates to a device and a method for automatically sensing the wear state of movable wheels or rollers (1) in conveying systems, for example baggage conveying systems. It achieves the object of easily and reliably sensing the wear state in an automatic fashion using measuring equipment when the roller to be checked runs through the system, by means of a measuring station (2,3) which is arranged in a stationary fashion in the conveying path of the system and in which diameter deviations of the wheel or of the roller (1) from a predefined set point diameter can be sensed in a contactless fashion and signaled.

18 Claims, 1 Drawing Sheet

DEVICE FOR SENSING THE WEAR STATE OF WHEELS OR ROLLERS

BACKGROUND OF THE INVENTION

The invention relates to a device for automatically sensing the wear state of movable wheels or rollers in conveying systems, in particular to sensing the wear state of directing rollers or guide rollers on containers of baggage conveying systems.

In a large number of technical systems, rollers or wheels are used to convey or guide system components, the rollers or wheels being of course subject to wear. If the wear state can easily be determined visually, the worn components can be replaced in good time before damage occurs to the system. However, the wheels or rollers are frequently integrated into the system in such a way that they can only be viewed from the outside with difficulty, or cannot be viewed at all. Wear, which occurs, is then frequently not noticed until damage has already occurred to the system. If one wishes to prevent this, the corresponding components which are subject to wear must be regularly inspected and replaced if necessary, which frequently entails a considerable degree of expenditure on installation and a down time of the system. It would therefore be advantageous to sense the wear state of movable wheels or rollers automatically as they run through or run around in the system, in order to be able to detect worn rollers or wheels in a selected fashion and replace them at the correct time.

SUMMARY OF THE INVENTION

The object of the present invention is to provide a device and a working method for automatically sensing the wear state of movable wheels or rollers in conveying systems with which any roller which runs through the system and is to be checked is easily and reliably sensed using measuring equipment, and with which a signal which indicates a worn wheel or a worn roller is generated.

In order to achieve the object, according to the invention a device is proposed which is characterized by a measuring station through which the wheel or the roller runs and which is arranged in a stationary fashion in the conveying path of the system and in which diameter deviations of the wheel or of the roller from a predefined set point diameter can be sensed in a contactless fashion and signaled.

According to the invention, the changing diameter of the wheel or the roller is a measure of its wear state. In the unused state, each roller or each wheel has a predefined set point diameter which changes, i.e., becomes smaller, in the course of use. This reduction in the diameter is tolerable up to a certain degree, but, if the diameter of the wheel or the roller drops below a specific value and if damage is expected to occur to the system, the component must be replaced. By simple contactless measurement of the diameter while the roller is running through the measuring station, this wear state can be detected and the time for the replacement of the wheel or the roller can be signaled.

According to one particular feature of the invention, the diameter deviation of the wheel or of the roller is sensed optically in the measuring station. The optical measuring method permits the measurement to be carried out in an uncomplicated way as the wheel or roller runs through. In contrast, known mechanical measurements can be carried out only in the state of rest of the wheel or of the roller.

In one particularly favorable refinement of the invention there is provision that, in order to sense the diameter deviations in the measuring station, the wheel or the roller is guided through two parallel photoelectric barriers which are spaced apart from one another, are directed tangentially with respect to the circumference of the wheel or roller and whose spacing corresponds to the smallest still permissible diameter of the wheel or of the roller.

The parallel photoelectric barriers—laser beams can also be used—are the core of the optical wear-measuring system. Owing to their parallel spacing, which can be defined precisely, the wear state of a wheel or of a roller that is running through can be determined precisely. If the wheel or the roller is in a "satisfactory state", that is to say the diameter of the roller has not yet dropped below a minimum value, both photoelectric barriers are interrupted simultaneously for a brief time when the roller runs through. If this is not the case, the roller which runs through is shorter than the spacing between the photoelectric barriers, which indicates an excessive wear state and makes it necessary to change the wheel or the roller.

It is structurally simple if, in order to improve the measuring accuracy in the measuring station, a slotted plate is provided whose two slots, which are arranged spaced apart, each guide a defined light beam onto sensors located opposite, in order to form the photoelectric barriers. The sensors, which are located opposite, are configured in such a way that they detect the interruption of the light beam, or do not reflect when there is an interruption. The proposed slotted plate can easily be prepared and installed on the system; the slots can be made very precisely, and no longer need to be adjusted with respect to the system in terms of their lateral spacing.

According to the invention, the measuring device is assigned an evaluation unit in which the measurement signal, which is received by the sensors, can be evaluated and converted into a signal. This evaluation unit can be accommodated in a housing together with all the necessary accessories. The sensors and a power supply are connected to the evaluation unit. Three signals are received from said unit, specifically two signals for the photoelectric barriers for monitoring for failure and total breakage of a wheel, as well as an OK signal for a roller, which is detected as "satisfactory".

In order to be able to detect that a specific roller or a wheel is to be tested is present, according to a further feature of the invention, an initiator is provided at the level of the measuring station, said initiator providing a "presence signal" to the measuring station.

If a measuring station according to the invention is used in a system in which a plurality of wheels and/or rollers are to be checked, the controller must be able to detect which wheel or which roller is to be removed or has to be replaced, if appropriate at the next service due date. For this purpose, in order to identify the wheel or the roller, a reading point for information which is carried along with the wheel or the roller is provided upstream of the measuring station. This information can be provided, for example, on a container, which is conveyed by the roller, and may be machine-readable in a conventional fashion. The information which is read is then directed to the computer and processed, for example, to form a signal for the removal of a container with a defective roller or a defective wheel.

The measuring method according to the invention is characterized in that a brief simultaneous interruption of both photoelectric barriers when the wheel or the roller runs through two parallel photoelectric barriers which are spaced apart from one another in a defined fashion is evaluated as a signal for a wheel without wear or a roller without wear, and the absence of a brief simultaneous interruption of both photoelectric barriers when the wheel or the roller runs through the photoelectric barriers is evaluated as a signal for a worn wheel or a worn roller.

The present invention provides a surprisingly simple and functionally reliable solution to the sensing of worn rollers or wheels, which can be used in a versatile fashion. The device is largely free of maintenance and cost-effective; it can also be retrofitted into existing systems.

An exemplary embodiment of the invention is illustrated in the drawings and will be described below using the example of a baggage conveying system such as is used at airports for conveying containers, which hold pieces of baggage.

DETAILED DESCRIPTION OF THE PREFERRED EMBODIMENT

Figure 1:
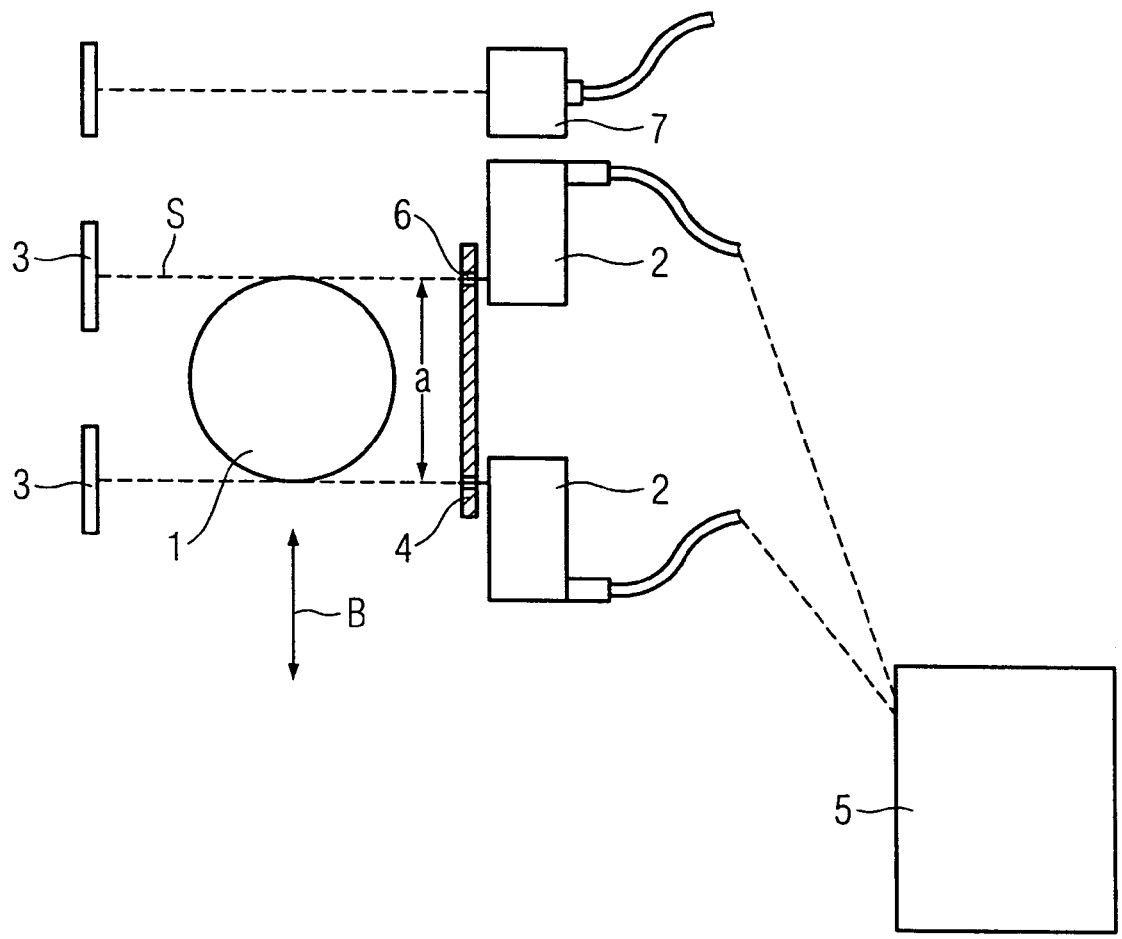
FIG. 1 shows the schematic structure of a device according to the invention in a plan view.

In the figures in the drawing, the device according to the invention for automatically sensing the wear state of movable rollers is illustrated in a roughly schematic fashion in order to use it to explain the method of operation of the invention. In FIG. 1, two photoelectric barriers are designated by 2 and they each direct a light beam S onto in each case one of the reflectors 3 which are arranged on the opposite side of each photoelectric barrier 2. The light beams S are oriented at a precisely defined distance a and run parallel to one another. 1 designates a roller which is to be measured and which can be moved through the measuring station in the direction b of movement, as is indicated by the double arrow.

4 designates a slotted plate which is provided with holes 6 which have precisely the same spacing as the light beams S and through which the light is guided with a high degree of accuracy and reflected. The sensors, for example, the reflectors 3 of the measuring station, detect the light beams S, and their reflection or interruption is sensed in a conventional fashion in the evaluation unit which is designated by 5. The evaluation unit supplies the three signals, specifically the function of the respective photoelectric barrier and an OK signal for a roller which is detected as "satisfactory", or the signal for a roller which is detected as "worn".

In order to be able to detect that a specific roller or a wheel is to be tested is present, an initiator 7 is provided at the level of the measuring station, said initiator providing a "presence signal" to the measuring station.

Figure 2:
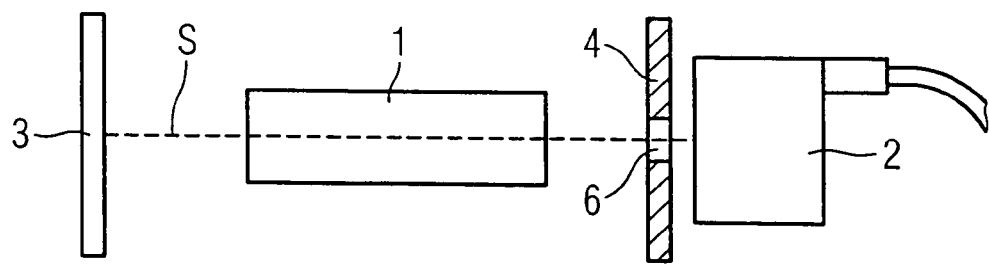
FIG. 2 is a side view of the device according to FIG. 1.

In the side view of FIG. 2, identical parts have the same designations.

Method of Operation:

If a roller 1 runs through the measuring station, the photoelectric barriers are interrupted successively. If the diameter of the roller is large enough, if it therefore corresponds to the set point dimension, both photoelectric barriers are interrupted simultaneously for a very brief moment. This is signaled via the sensors to the evaluation unit 5, and they indicate that the roller is not worn. In this context, the light beams S are guided so precisely by the defined spacing of the slots in the slotted plate (corresponds to a) that a precise statement about the degree of wear of the roller can be made.

If the roller diameter is smaller than the spacing a of the light beams S, simultaneous interruption of the photoelectric barriers, which generates a "fault message" in the evaluation unit 5, does not take place at any time as the roller runs through. It is then possible to infer that a worn roller has run through the measuring station or else there was no roller present at all.

Since the roller, or a container on which the roller is mounted, has run through a reading point which identifies the container, and which of the rollers is worn is therefore known, the corresponding container can be tracked in the system and replaced at the appropriate time.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A device for automatically sensing the wear state of movable wheels or rollers in conveying systems, comprising:
    a conveying system having movable wheels or rollers;
    a measuring station through which each wheel or the roller runs, said measuring station arranged in a stationary fashion in the conveying path of the system, wherein diameter deviations of the wheel or of the roller from a predefined set point diameter can be sensed in a contactless fashion and signaled with said measuring station; and
    wherein said measuring station comprises two photoelectric beam emitters that emit two parallel photoelectric beams which are spaced apart from one another, said photoelectric beams being directed tangentially with respect to the circumference of the wheel or roller and are spaced apart corresponding to the smallest permissible diameter of the wheel or of the roller, wherein the wheel or the roller is guided through said photoelectric beams in order to sense diameter deviations.

2. The device as claimed in claim 1, including a slotted plate having two slots which are arranged spaced apart, each of said slots guiding a defined photoelectric beam from one of said photoelectric beam emitters onto one of two sensors located opposite said slotted plate, thereby improving accuracy of said measuring station.

3. The device as claimed in claim 2, wherein said measuring station includes an evaluation unit which receives a measurement signal by the sensors, said evaluation unit evaluates the measurement signal and converts the measurement signal into a display signal.

4. The device as claimed in claim 3, including an initiator installed at a level of said measuring station, said initiator detecting the wheel or the roller in the measuring station.

5. The device as claimed in claim 4, including a reading device upstream of the measuring station, said reading device reading information which is carried along with the wheel or the roller.

6. The device as claimed in claim 1 adapted to sense the wear state of directing rollers or guide rollers on containers of baggage conveying systems.

7. The device as claimed in claim 6, including a slotted plate having two slots which are arranged spaced apart, each of said slots guiding a defined photoelectric beam from one of said photoelectric beam emitters onto one of two sensors located opposite said slotted plate, thereby improving accuracy of said measuring station.

8. The device as claimed in claim 7, wherein said measuring station includes an evaluation unit which receives a measurement signal by the sensors, said elevation unit evaluates the measurement signal and converts the measurement signal into a display signal.

9. The device as claimed in claim 8, including an initiator installed at the level of said measuring station, said initiator detecting the wheel or the roller in the measuring station.

10. The device as claimed in claim 9, including a reading device upstream of the measuring station, said reading device reading information which is carried along with the wheel or the roller.

11. The device as claimed in claim 1, wherein said measuring station includes an evaluation unit which receives a measurement signal by the sensors, said evaluation unit evaluates the measurement signal and converts the measurement signal into a display signal.

12. The device as claimed in claim 11, including an initiator installed at a level of said measuring station, said initiator detecting the wheel or the roller in the measuring station.

13. The device as claimed in claim 12, including a reading device upstream of the measuring station, said reading device reading information which is carried along with the wheel or the roller.

14. The device as claimed in claim 1, including an initiator installed at a level of said measuring station, said initiator detecting the wheel or the roller in the measuring station.

15. The device as claimed in claim 14, including a reading device upstream of the measuring station, said reading device reading information which is carried along with the wheel or the roller.

16. The device as claimed in claim 1, including a reading device upstream of the measuring station, said reading device reading information which is carried along with the wheel or the roller.

17. A measuring method for automatically sensing the wear state of movable wheels or rollers in conveying system; comprising:

providing two parallel photoelectric beams which are spaced apart from one another in a defined fashion;

interpreting a brief simultaneous interruption of both photoelectric beams when the wheel or the roller runs through said photoelectric beams as an indication of a wheel without wear or a roller without wear; and interpreting the absence of a brief simultaneous interruption of both photoelectric beams when the wheel or the roller runs through the photoelectric beams as an indication of a worn wheel or a worn roller.

18. The method of claim 17 used to sense the wear state of directing rollers or guide rollers on containers of baggage conveying systems.

* * * * *